Dec. 25, 1956  W. E. MILLER  2,775,485
AUTOMOBILE WASHING MEANS
Filed March 15, 1954
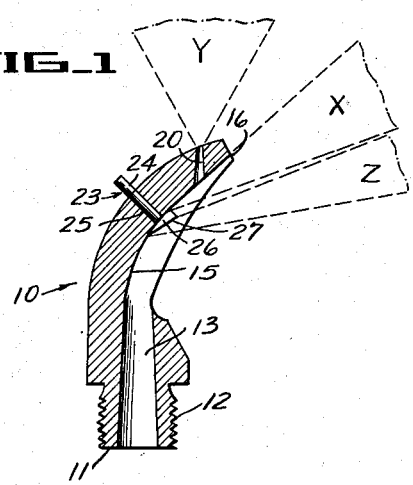
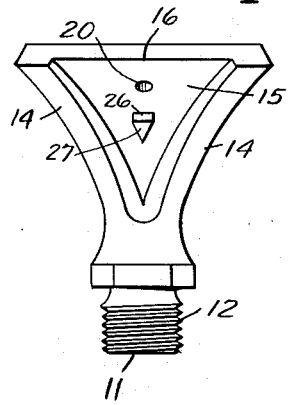
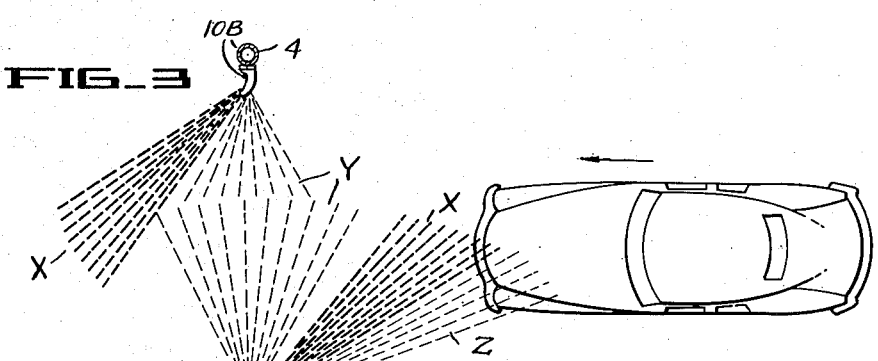
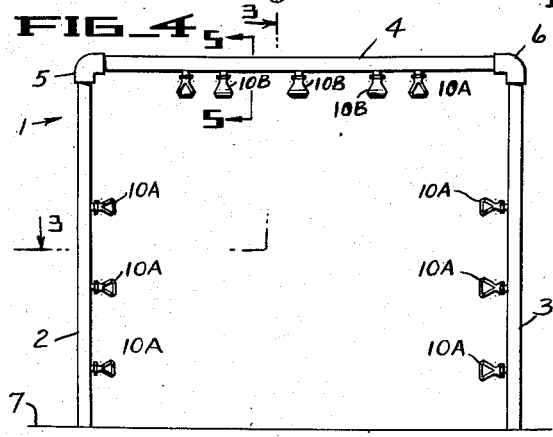
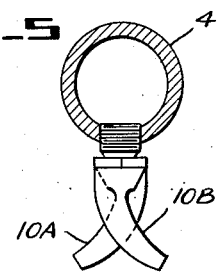
INVENTOR.
WILLIAM E. MILLER
BY
Boyken, Mohler & Beckley
ATTORNEYS

United States Patent Office 2,775,485
Patented Dec. 25, 1956

2,775,485

AUTOMOBILE WASHING MEANS

William E. Miller, Mill Valley, Calif.

Application March 15, 1954, Serial No. 416,155

2 Claims. (Cl. 299—121)

This invention relates to the art of washing automobiles and more particularly to a compact wash rack which is adapted to spray an automobile with water for washing said automobile.

Heretofore various types of installations and apparatus have been evolved for washing automobiles, but for the most part such prior art devices have been very complicated and have required a great expenditure of money for the initial installation to say nothing of the maintenance cost.

In addition, in the past, insufficient attention has been given to the type of spray required to remove dirt and grime from the surface of the automobile so that, for the amount of water employed, efficient cleaning has not always been effected.

In particular, prior art installations have not provided for efficient wetting of the automobile surfaces prior to the actual removal of the dirt and grime. Although the cleaning operation may be successfully performed when the quantity of water employed is disregarded, it is extremely important, especially in some localities, to economize to the greatest extent with water, if a profitable operation is to result.

It is therefore the main object of the present invention to provide an automobile washing means which overcomes the disadvantages of prior art devices of like nature.

Another object of the invention is the provision of an improved arrangement of nozzles which results in a more efficient washing operation than heretofore possible.

Still another object of the invention is the provision of a discharge nozzle which is economical to manufacture and more efficient for washing automobiles.

Yet another object of the invention is the provision of an improved water discharge nozzle for an automobile washing installation which incorporates the various functions of wetting the surfaces to be washed, removing the dirt and grime from said surfaces, and rinsing.

Other objects and advantages will be seen in the following specification and in the drawings.

Fig. 1 is a longitudinal cross section through the nozzle of the present invention.

Fig. 2 is a front elevation of the nozzle of Fig. 1.

Fig. 3 is semi-schematic top plan view of the automobile washing operation and showing one nozzle in plan view and one in side elevation substantially as taken along lines 3—3 of Fig. 4.

Fig. 4 is a front elevation of the automobile wash rack of the present invention taken from the side directed toward an oncoming automobile.

Fig. 5 is a vertical cross sectional view through the wash rack as taken along lines 5—5 of Fig. 4.

As best seen in Figs. 3, 4 the present invention comprises a wash rack generally designated 1 which consists of a pair of vertically extending, horizontally spaced, pipes 2, 3 (Fig. 4) connected at their upper ends to a horizontally extending pipe 4 by means of elbows 5, 6.

It will be understood that water under pressure is fed into the rack 1 either from under the ground level 7 or in any other convenient manner.

The rack 1 is therefore in the form of an arch through which an automobile may be driven by a driver under its own power or by any other method.

As will subsequently be described, the rack 1 is provided with a plurality of nozzles for producing a spray adapted to be directed on the automobile.

Referring to Figs. 1, 2 the invention comprises a nozzle generally designated 10 and comprising a body having a boss 11 at one end which is externally threaded as at 12 so as to be releasably secured within complementarily tapped holes in pipes 2, 3, 4 of rack 1.

Boss 11 is formed with a central bore 13 through which a stream of water is adapted to be directed from rack 1. The central axis of bore 13 is coaxial with the central axis of the body 10 and the latter is symmetrical about said axis.

From the boss 11 the body 10 is flared laterally and provided with flanges 14 as best seen in Fig. 2 and is provided with a curved surface 15 between said flanges which also increases in width in a direction away from bore 13. The curvature of the surface 15 is gradual so as to be tangent to the bore 13 at its inner end and disposed at an angle of about 50 degrees to said bore at its outer end 16.

The result of the above defined structure is that a spray, schematically designated X in Fig. 1, is produced which is disposed at an angle of about 60 degrees relative to the central axis of the body 10. This spray is a relatively heavy one and constitutes practically the entire output through the bore 13.

Adjacent the outer end 16 of the nozzle 10, the body 10 is provided with a relatively small aperture 20 which extends from the surface 15 to the rear side of body 1 in a direction substantially parallel to but offset from the axis of bore 13. Aperture 20 is positioned on the central axis of the body 1 and converges in a direction away from surface 15 so as to form an expanding spray Y (Fig. 1). As can best be seen in Fig. 1, the sprays X and Y are distinct and the latter is considerably finer than the former.

Between the aperture 20 and the bore 13 there is positioned a projection or deflector generally designated 23. This deflector 23 comprises a pin 24 which is tightly fitted within a complementarily formed drilled hole 25 in the body 10. Hole 25 is normal to the surface 15.

Integral with the pin 24 is an enlarged head 26 which is generally in the shape of an isosceles triangle with the apex 7 of the triangle directed toward the bore 13. Head 26 is formed with a surface 27 disposed at an angle of about 70 degrees relative to the axis of bore 13 so that water in the stream from the bore 13 impinges on said surface to form a spray Z (Fig. 1) at an angle of about 75 degrees to the central axis of the body 10.

Inasmuch as the area of the spray forming surface 27 of deflector 23 is relatively small, the spray Z is correspondingly small compared to the spray X.

The pin portion 24 of the deflector 23 normally extends beyond the body 10 so that the same may be struck gently with a hammer to move the head 26 outwardly from the surface 15 when desired. By this procedure the angularity of spray Y may be adjusted as desired within certain limits. By striking the head 26 of the deflector 23 the latter may be moved toward surface 15 when desired.

When the spray Z is not required the deflector 23 may be removed, in which case no substantial amount of water passes through drilled hole 25 because of the relatively great angle which said hole makes with the bore 13 and also with the surface 15.

In Fig. 4 the preferred arrangement of nozzles is shown, the nozzles which are provided with deflectors 23 being designated 10A and nozzles employed without deflectors 23 being designated 10B.

Three spaced apart nozzles 10A are provided on each of the vertical pipes 2, 3 (Fig. 4) and two nozzles 10A are provided on the horizontal pipe 4. The nozzles 10A on horizontal pipe 4 are relatively widely spaced apart and between the same are three spaced nozzles 10B.

As best seen in Fig. 5 the nozzles 10B on pipe 4 are directed in the opposite direction from nozzles 10A.

By the above described arrangement eight nozzles 10A are provided which are directed toward an oncoming automobile moving in the direction indicated by the arrow in Fig. 3 and three nozzles 10B are directed away from said automobile.

In operation, and when the water pressure to the rack 4 is turned on and said automobile is about in the position shown in Fig. 3, the automobile is first drenched by a relatively fine spray which is the total output of all the sprays Z of nozzles 10A (Fig. 3). This constitutes the prerinse or wetting spray which conditions the surface of the automobile to the subsequent cutting or dirt removal step carried out by sprays X of nozzles 10A.

As pointed out above, the sprays X are the most forceful and function to positively remove the dirt and grime from the surfaces of the automobile after said surfaces have been wetted by sprays Z. It will be noted that the arrangement of the nozzles is such that the sprays impinge on both lateral sides of the automobile as well as on the top and hood. In addition, it will be noted that the direction of the sprays X and Z of nozzles 10 is opposite to that of the automobile so that the sprays impinge on the surfaces of the automobile at a relaively acute angle during the greater part of the washing operation, thus facilitating the removal of dirt and grime.

Inasmuch as the direction of nozzles 10A is reversed from that of nozzles 10B it will be apparent that the sprays Y of nozzles 10B impinge on the automobile before the heavier sprays X. The result of this arrangement is that the sprays Y of all the nozzles, both 10A and 10B, impinge on the automobile as the latter passes under the rack 1 so that the automobile surfaces are kept soaked at all times.

As the automobile moves away from the rack 1 the full effect of the sprays X of nozzles 10B is brought to bear on the automobile and the latter is completely rinsed. It will be noted that the nozzles 10B drench the hood and the top surface of the automobile which is desirable inasmuch as any dirt and grime remaining is washed downwardly with no opportunity to remain on the cleaned surfaces.

The present invention contemplates any suitable method of turning on the water such as a treadle switch actuatable by the weight of the automobile as the latter approaches the rack. More particularly, however, the invention contemplates a coin controlled system whereby the customer may drive the automobile through the wash rack after he has deposited a coin, such as a quarter dollar, in a coin box. In such a case the coin actuates a switch which in turn opens the water valve so that the water pressure is either immediately applied to the nozzles or after the automobile engages a treadle switch in series with the above mentioned switch.

In such a self service installation it is extremely important that the water supply be used as efficiently as possible and it is for this reason that the nozzles and the arrangement thereof as described above is so important.

It is also important to note that the cost of the original installation is minimized by the use of one nozzle having three separate functions and which may be readily adjusted as to one of said functions and which may be easily altered to eliminate said one function.

The above detailed description is not to be taken as restrictive of the invention as it is obvious that various modifications in design may be resorted to without departing from the spirit of the invention.

I claim:

1. A nozzle comprising a body provided with means for securing the same to a source of water pressure and provided with an inlet adapted to conduct a stream of water therethrough, said body being integrally provided with a surface on which said stream is adapted to impinge and angularly disposed relative to the latter for deflecting said stream to form a first spray at an angle to said stream, said body being provided with an aperture communicating with said surface and extending in substantially the same direction as said inlet for forming a second spray, a projection carried by said body on said surface and having a surface on which said stream is adapted to impinge for forming a third spray, said surface on said projection being at a greater angle relative to said stream than said surface of said body whereby said first spray is between said second and third sprays.

2. A nozzle comprising a body provided with means for securing the same to a source of water pressure and provided with an inlet adapted to conduct a stream of water therethrough, said body being integrally provided with a surface on which said stream is adapted to impinge and angularly disposed relative to the latter for deflecting said stream to form a first spray at an angle to said stream, said body being provided with an aperture communicating with said surface and extending in substantially the same direction as said inlet for forming a second spray, a projection carried by said body adjacent said surface and having a surface on which said stream is adapted to impinge for forming a third spray, said surface on said projecting being at a greater angle relative to said stream than said surface of said body whereby said first spray is between said second and third sprays, said projection being mounted on said body for adjustable movement toward and away from the latter for changing the angularity of said third spray.

References Cited in the file of this patent

UNITED STATES PATENTS

| | | |
|---|---|---|
| 2,199,142 | Russell | Apr. 30, 1940 |
| 2,536,361 | Flanders | Jan. 2, 1951 |
| 2,665,171 | Stievater | Jan. 5, 1954 |

FOREIGN PATENTS

| | | |
|---|---|---|
| 635,716 | Germany | Sept. 22, 1936 |